US012092315B2

(12) United States Patent
Diedrich et al.

(10) Patent No.: US 12,092,315 B2
(45) Date of Patent: *Sep. 17, 2024

(54) LIGHT AND SPEAKER APPARATUS

(71) Applicant: AFCO, Inc., Memphis, TN (US)

(72) Inventors: Brad Diedrich, Depere, WI (US); Joseph LoMonaco, San Diego, CA (US); Blake Franchini, Germantown, TN (US)

(73) Assignee: AFCO, INC., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,065

(22) Filed: Sep. 28, 2023

(65) Prior Publication Data

US 2024/0240784 A1 Jul. 18, 2024

Related U.S. Application Data

(63) Continuation of application No. 18/098,321, filed on Jan. 18, 2023, now Pat. No. 11,815,254.

(51) Int. Cl.

| | |
|---|---|
| ***F21S 6/00*** | (2006.01) |
| ***F21V 33/00*** | (2006.01) |
| ***H04R 1/02*** | (2006.01) |
| ***H04R 1/32*** | (2006.01) |

(52) U.S. Cl.

CPC .......... *F21V 33/0056* (2013.01); *F21S 6/005* (2013.01); *H04R 1/028* (2013.01); *H04R 1/323* (2013.01)

(58) Field of Classification Search

CPC ...... F21V 33/0056; H01R 1/323; H01R 1/028

See application file for complete search history.

(56) References Cited

U.S. PATENT DOCUMENTS

| | | | | |
|---|---|---|---|---|
| 7,246,064 | B1 | 6/2007 | Thomas | |
| 9,668,053 | B1 | 5/2017 | Rivera et al. | |
| 10,045,101 | B1 | 8/2018 | Hsu | |
| 2009/0168411 | A1* | 7/2009 | Yen | F21V 21/0824 362/183 |
| 2014/0360805 | A1 | 12/2014 | Berkman et al. | |
| 2015/0124441 | A1 | 5/2015 | Lam et al. | |
| 2015/0249777 | A1 | 9/2015 | Chen | |
| 2015/0300581 | A1 | 10/2015 | Huang | |

(Continued)

FOREIGN PATENT DOCUMENTS

WO WO-2021147614 A1 * 7/2021 .............. F21V 33/00

OTHER PUBLICATIONS

IXTECH Outdoor Bluetooth Speakers, Waterproof Portable Bluetooth Speaker Wireless with Lights, Outdoor Gifts for Dads Mom, Multi-Sync Wireless Connection, Lantern Speakers Mountable, 2 pack, pp. 1-9; https://www.amazon.com/IXTECH-Bluetooth-Waterproof-Multi-Sync-Connection/dp/B0BGVC5TRY/ref=sr_1_36?keywords=outdoor+speaker+lights&qid=1667507238&qu=eyJxc2MiOiI0LjgxliwicXNhljoiNC41MSIsInFzcCI6IjMuNDlifQ%3D%3D&sr=8-36&ufe=app_do%3Aamzn1.fos.18ed3cb5-28d5-4975-8bc7-93deae8f9840.

(Continued)

*Primary Examiner* — Zheng Song

(74) *Attorney, Agent, or Firm* — Wyatt, Tarrant & Combs, LLP; Max E. Bridges; Matthew A. Williams

(57) ABSTRACT

A light and speaker apparatus comprising a light, one or more audio speakers, and various channels which permit sound to project in multiple directions including both upwards and downwards. In some embodiments, the light and the one or more speakers are positioned within a chamber inside the apparatus.

19 Claims, 9 Drawing Sheets

(56) References Cited

U.S. PATENT DOCUMENTS

| | | | | |
|---|---|---|---|---|
| 2016/0010846 | A1* | 1/2016 | Wu | F21V 33/0056 381/334 |
| 2016/0363312 | A1 | 12/2016 | You et al. | |
| 2017/0219173 | A1 | 8/2017 | Yotsumoto et al. | |
| 2020/0088360 | A1 | 3/2020 | Salzinger et al. | |
| 2021/0164628 | A1* | 6/2021 | Zheng | F21S 10/002 |

OTHER PUBLICATIONS

MOFOKEAY Outdoor Bluetooth Speakers Waterproof—2 Pack Wireless Torch Atmosphere Speakers with Stake & Hook, Sync Up to 100 Speakers, BT 5.3 Portable Speaker for Patio Camp Party, Gifts for Men Women; pp. 1-10; https://www.amazon.com/MOFOKEAY-Outdoor-Bluetooth-Speakers-Waterproof/dp/B0BC8K6LVG/ref=sr_1_17_sspa?keywords=outdoor+speaker+lights&qid=1667507181&qu=eyJxc2MiOil0LjgxliwicXNhljoiNC41MSIsInFzcCI6IjMuNDIifQ%3D%3D&sr=8-17-spons&ufe=app_do%3Aamzn1.fos.18ed3cb5-28d5-4975-8bc7-93deae8f9840&psc=1.

Theater Solutions TT100 Fully Wireless 120 Watt Rechargeable Battery Bluetooth Tiki Torch Speaker 2 Pack Lanterns Link Up to 99 Speakers Wirelessly, Black; pp. 1-9; https://www.amazon.com/Theater-Solutions-TT100-Rechargeable-Wirelessly/dp/B0892SMRJG/ref=sr_1_13?keywords=outdoor+speaker+lights&qid=1667507101&qu=eyJxc2MiOil0LjgxliwicXNhljoiNC41MSIsInFzcCI6IjMuNDIifQ%3D%3D&sr=8-13&ufe=app_do%3Aamzn1.fos.18ed3cb5-28d5-4975-8bc7-93deae8f9840.

Portfolio Bluetooth audio landscape light kit; pp. 1-4; https://www.ebay.com/itm/324301515403?chn=ps&mkevt=1&mkcid=28.

The United States Patent and Trademark Office; Notification of Transmittal of the International Search Report and the Written Opinion of the International Searching Authority, or the Declaration; PCT International Search Report and Written Opinion for PCT/US24/11584; May 3, 2024; pp. 1-19; US.

* cited by examiner

LIGHT AND SPEAKER APPARATUS

CROSS-REFERENCE TO RELATED APPLICATIONS

This continuation patent application claims the benefit of and priority to U.S. Nonprovisional patent application Ser. No. 18/098,321, filed on Jan. 18, 2023, the contents of which are fully incorporated herein by reference.

FIELD OF INVENTION

The embodiments described herein relate to a light and speaker apparatus for use in a variety of situations, including but not limited to, outdoor environments such as landscape lighting.

BACKGROUND

Landscape lighting (sometimes referred to as garden lighting or outdoor landscape lighting) generally refers to the outdoor illumination of public landscapes, parks, and/or private property to enhance nighttime aesthetics, provide accessibility, safety, and other purposes. An audio speaker, or loudspeaker, is an apparatus that converts electrical audio signals into sound which can be heard at a distance.

While some conventional approaches provide outdoor speakers, and others have combined lights with audio speakers for use in outdoor settings, these traditional apparatuses suffer from a number of limitations and disadvantages including poor sound quality. Moreover, the typical outdoor speakers project sound only up into the air such that the sound is audible only in the direct path of the sound. Other conventional outdoor speakers direct sound only towards the ground which is optimal for low frequencies, such as bass and sub-bass often in the 20 Hz-2,000 Hz range, but results in poor overall sound clarity.

Accordingly, there is a significant need for a light and speaker apparatus which provides improved sound clarity at all audio spectrums (including in the low frequency range), improved audio efficiency, enhances nighttime aesthetics when used in the non-limiting example of landscape lighting, and provides safety features. Along with other non-limiting features and advantages, the light and speaker apparatus within the scope of present embodiments meets these and other needs. In doing so, the light and speaker apparatus, according to multiple embodiments and alternatives, provides better performance and produces improved acoustic quality and clarity, and projects sound in multiple directions including both upwards and downwards.

SUMMARY OF EMBODIMENTS

According to multiple embodiments and alternatives, the light and speaker apparatus comprises a light, one or more audio speakers, and various channels which permit sound to project in multiple directions including both upwards and downwards. In some embodiments, the light and the one or more speakers are positioned within a chamber located inside the light and speaker apparatus, and light is projected towards the ground.

According to multiple embodiments and alternatives, the light and speaker apparatus further comprises a speaker mask that is conical in shape (as non-limiting example) and defines a plurality of openings. The speaker mask is positioned above the speakers and the plurality of openings permit the passage of sound upwards. In some embodiments, a top cover having a top surface is adapted to receive the speaker mask and the top surface defines speaker borings which are adapted to receive the one or more speakers. The top cover further comprises a bottom surface that is adapted to receive a bottom cover. In turn, the bottom cover is adapted to receive a housing, which connects to a ring, a stem and a stake that is adapted to be driven into the ground to provide support. In some embodiments, the bottom of the speakers and the light are positioned within a chamber defined by the top and bottom covers. In further embodiments, the bottom cover comprises a translucent or transparent material to permit the passage of light from the light and speaker apparatus.

Compared to conventional approaches, the light and speaker apparatus according to multiple embodiments and alternatives produces improved sound clarity at all audio spectrums (including in the low frequency range), improved audio efficiency, enhances nighttime aesthetics, and provides safety features. Accordingly, the light and speaker apparatus provides a number of advantages over conventional outdoor speakers, along with other features disclosed herein.

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing FIGURES described and provided herein are not to scale, and that the embodiments are not limited to the precise arrangements and instrumentalities shown.

MULTIPLE EMBODIMENTS AND ALTERNATIVES

Figure 1:
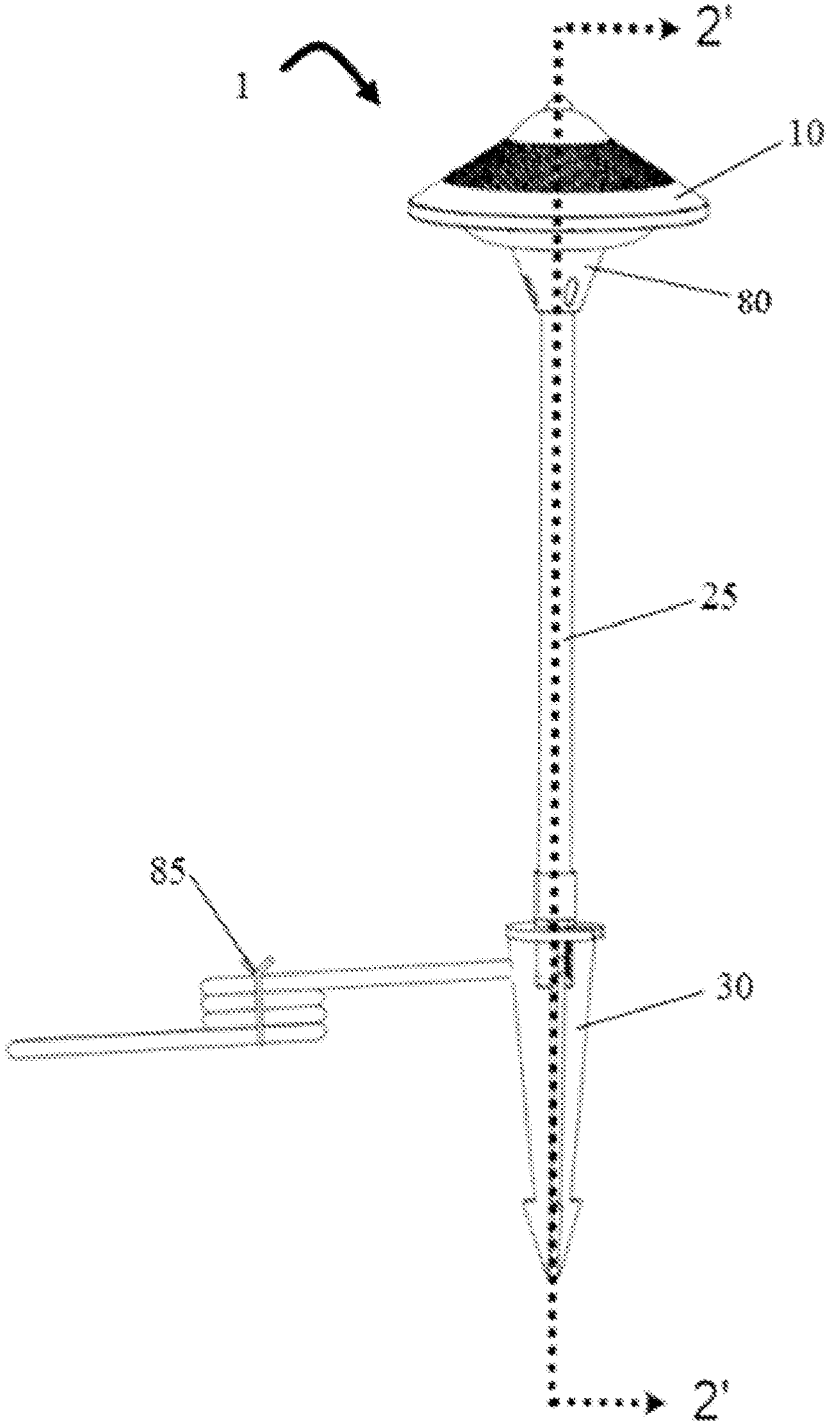
FIG. 1 is a perspective view of a light and speaker apparatus, according to multiple embodiments and alternatives.

FIG. 1 illustrates a light and speaker apparatus 1 (sometimes referred to herein as the "apparatus" for brevity) comprising a speaker mask 10 having a plurality of openings 12 (see FIG. 6), one or more speakers 35 (see FIG. 3) and a light 60 (see FIGS. 2A-2B) positioned within the apparatus 1. The apparatus 1 further comprises a top cover 15 having a top surface 16 that is adapted to receive both the speaker mask 10 and the speakers 35, and the top cover comprises a bottom surface 17 that is adapted to receive a bottom cover 20. The bottom cover 20 is adapted to receive a stem 25, and a stake 30 that is adapted to be driven into the ground to provide support. In some embodiments, the bottom cover 20 comprises a transparent or translucent material that permits the passage of light 60 from the apparatus 1.

In some embodiments, the top cover 15 defines a pair of speaker borings 18 (best illustrated in FIG. 6) that are adapted to receive the speakers 35 and permit the speakers 35 to project sound waves at an upwards angle from the apparatus 1. When the top cover 15 receives and connects to the bottom cover 20, the top and bottom covers 15, 20 define a chamber 22 that receives both the speakers 35 and the light 60. After the speakers 35 are mounted to the top cover 15, and the top cover 15 receives both the speaker mask 10 and the bottom cover 20, the apparatus 1 further defines a channel 21 (best illustrated in FIGS. 2A and 7) that permits sound waves to travel downward from apparatus 1. In some embodiments, the speaker mask 10, the stem 25, and the other components of apparatus 1 comprise the non-limiting examples of aluminum, copper, stainless steel, plastic, transparent materials, translucent materials, weatherproof materials, or others known to one of ordinary skill in the art. As shown in FIG. 1, a wire 85 for providing electrical power connects to the base of the light and speaker apparatus 1 and is routed upwards through the stem 25. In some embodiments, the speaker mask 10 is secured to the stem 25 with a top screw 5.

Figure 2A:
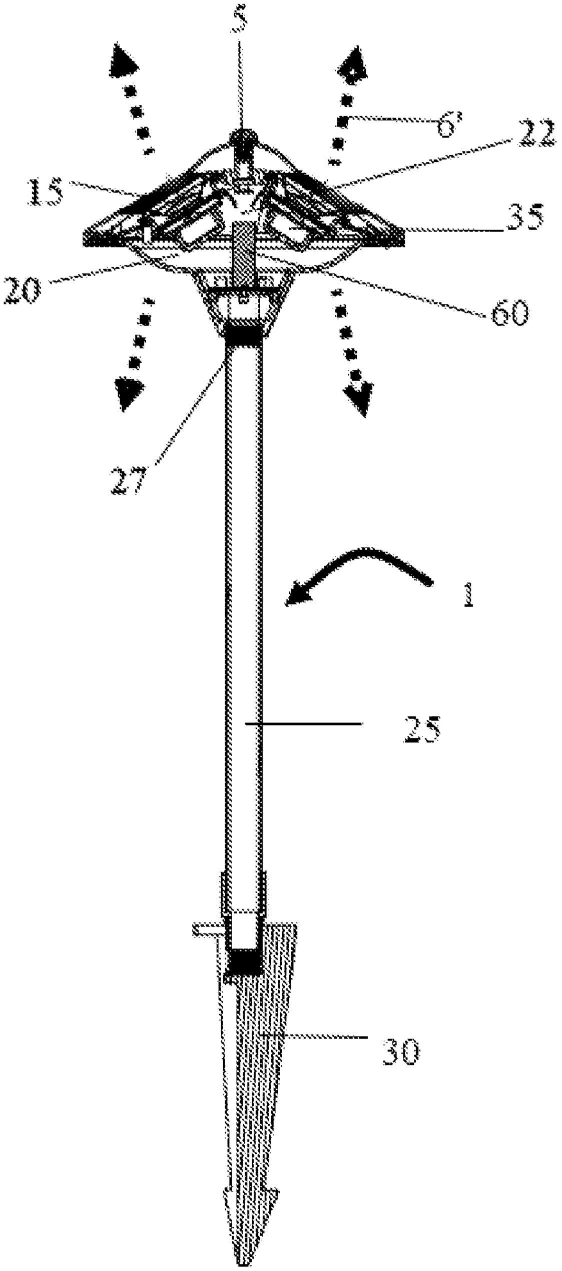
FIG. 2A is a cross-section view of a light and speaker apparatus across line 2'-2' of FIG. 1, according to multiple embodiments and alternatives.
Figure 2B:
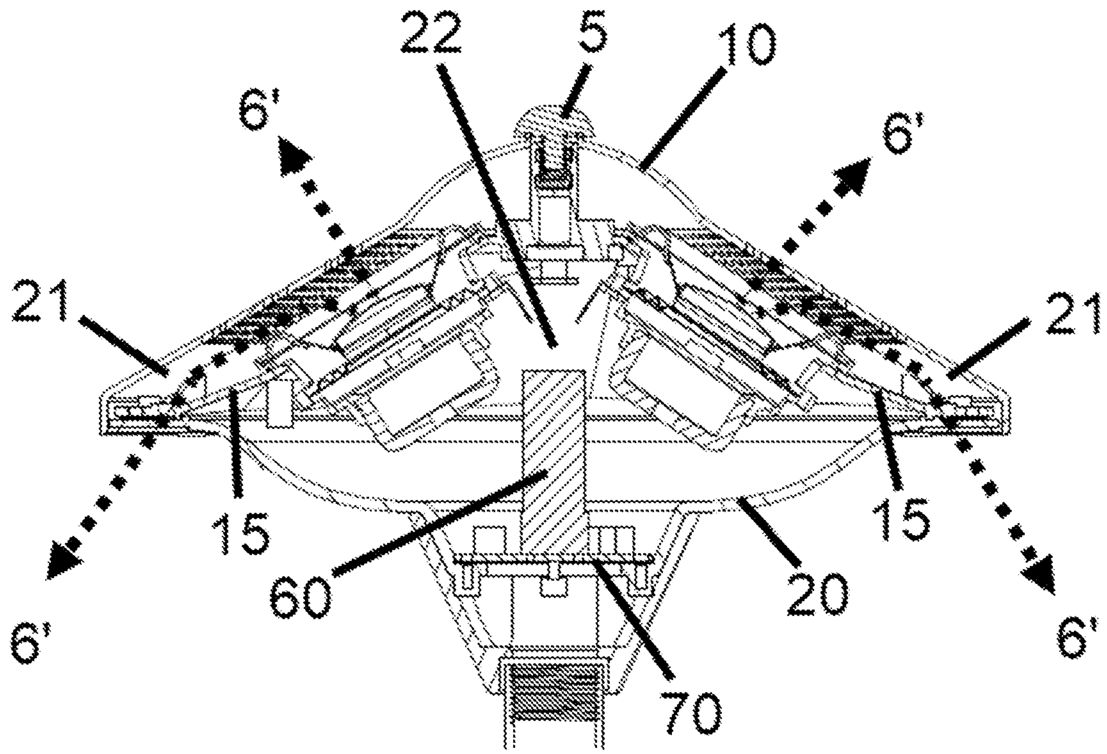
FIG. 2B is a close-up view of the speaker mask, top cover, and bottom cover, from FIG. 2A, according to multiple embodiments and alternatives.
Figure 3:
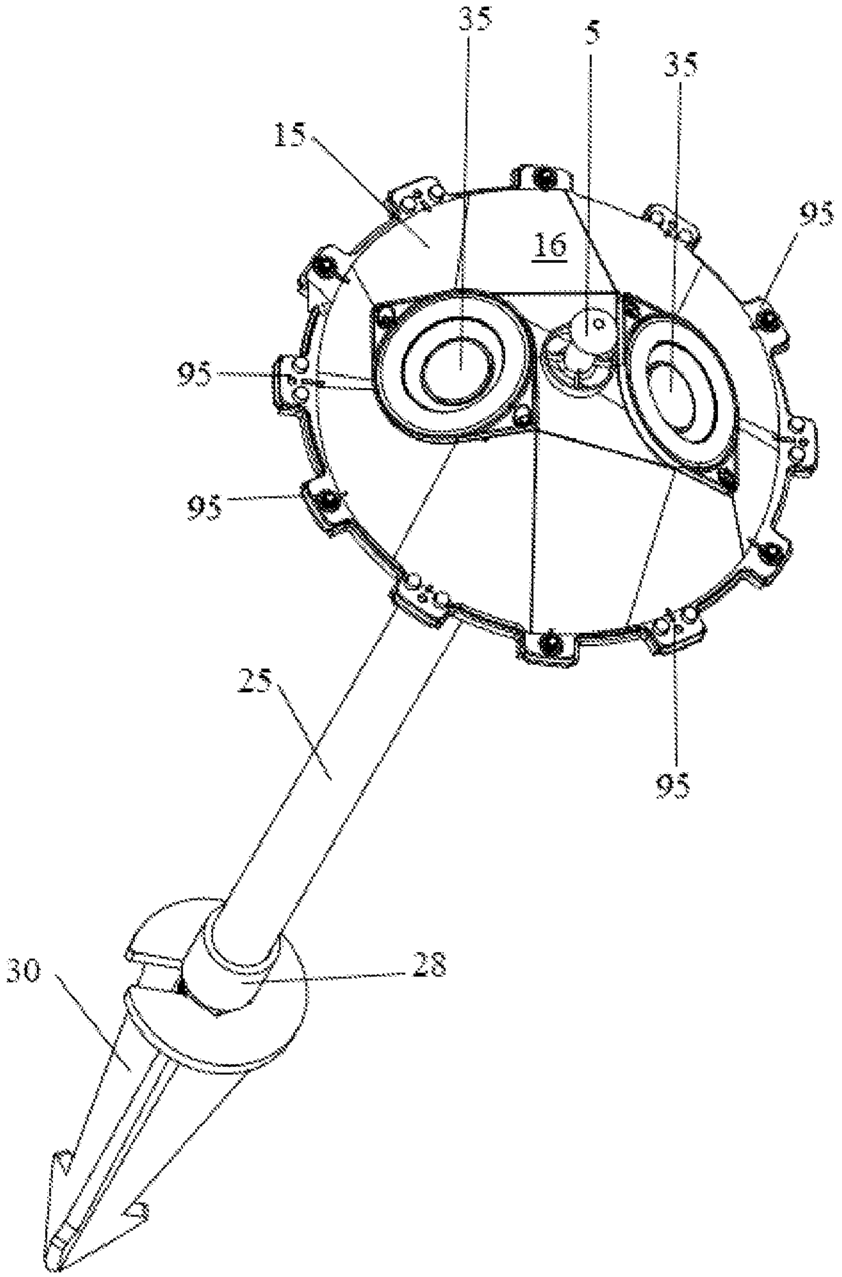
FIG. 3 is a top, perspective view of a light and speaker apparatus without a speaker mask, according to multiple embodiments and alternatives.

As illustrated by FIGS. 2A, 2B, and 3, the apparatus 1 contains, as a non-limiting example, two speakers 35 that rest on speaker washers 40 (best illustrated in FIG. 8) and the speakers 35 are received within the speaker borings 18. The speakers 35 are secured in place to the top cover 15 with screws 45 (as a non-limiting example), and the bottom of the speakers 35 are positioned in the chamber 22 defined by the bottom surface 17 of the top cover 15 and an interior surface of the bottom cover 20. Once the speaker mask 10 is mounted to the top surface 16 of the top cover 15, the apparatus 1 emits sound waves both upwards and downwards along arrows 6'.

As shown in FIGS. 2A-2B, in some embodiments sound emits upwards through the plurality of openings 12 of the speaker mask 10 along arrows 6' and sound emits downwards thru the channel 21 along arrows 6'. In FIG. 2B, the top cover 15 is sized to fit within the speaker mask 10. Accordingly, the channel 21 is defined by the internal surface of the speaker mask 10 and the top surface 16 of the top cover 15, thereby permitting sound to travel from the speakers and pass downwards.

In some embodiments, the speaker mask 10 is conical in shape and detachable from the top cover 15. As shown in FIGS. 2A-B, a light 60 is positioned above the top end 27 of the stem 25 and within chamber 22. In some embodiments, the chamber 22 contains a light 60. As known to one of ordinary skill in the art, any number of lights can be utilized in the apparatus 1 including, but not limited to, LEDs that emit white light and/or various colors.

FIG. 3 illustrates the top surface 16 of top cover 15, as well as the stem 25, and the stake 30 mounted to the bottom end 28 of the stem 25. According to multiple embodiments and alternatives, the top surface 16 defines a pair of speaker borings 18 (see FIG. 6) that are adapted to receive the speakers 35. The outer edge of both the top and bottom covers 15, 20 define a plurality of threaded borings 75 which are adapted to receive screws 45 (as a non-limiting example), to secure the top cover 15 to the bottom cover 20. As shown in FIG. 3, the top screw 5 extends upwards from the top cover 15 and is adapted to secure the speaker mask 10 to the top surface 16.

Figure 4:
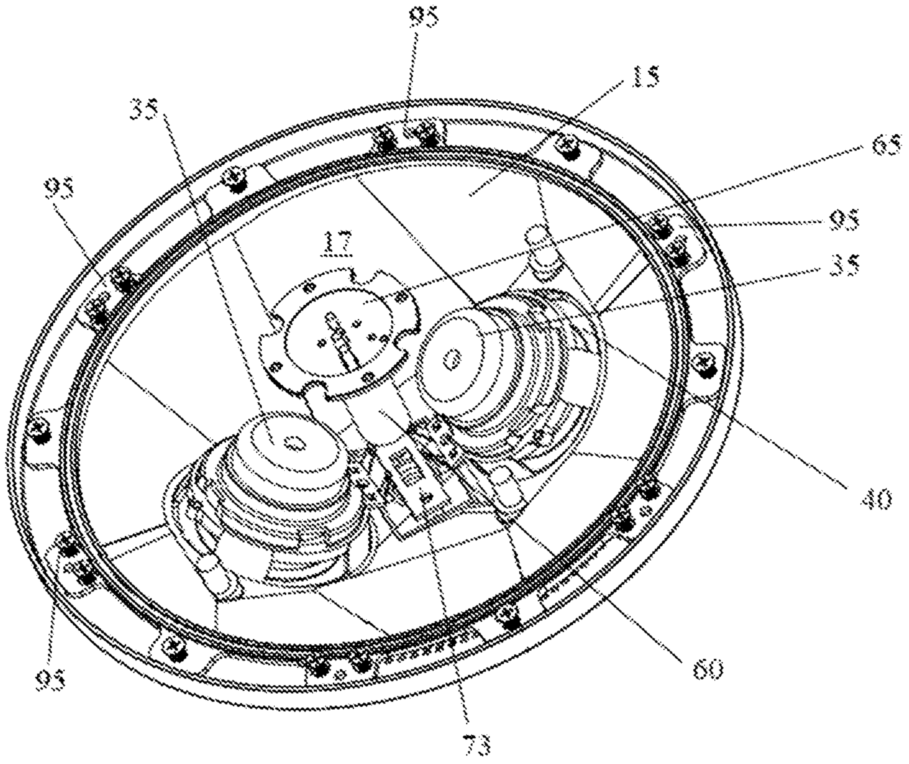
FIG. 4 is a bottom, perspective view of a portion of a light and speaker apparatus, according to multiple embodiments and alternatives.

FIG. 4 illustrates the speakers 35 mounted to the bottom surface 17 of the top cover 15 via screws 45, and the top cover 15 which is connected to the speaker mask 10 via screws 45. Top cover 15 is sized to fit within the speaker mask 10. In FIG. 4, the speaker washers 40 are mounted about the bottom of the speaker 35. In some embodiments, a light receiver 73 is mounted to the bottom surface 17 of the top cover 15 and is adapted to receive the light 60. Once connected to the light receiver 73, the light 60 receives lampholder 65, connects to light plate 70, then the light 60 extends into housing 80.

Figure 5:
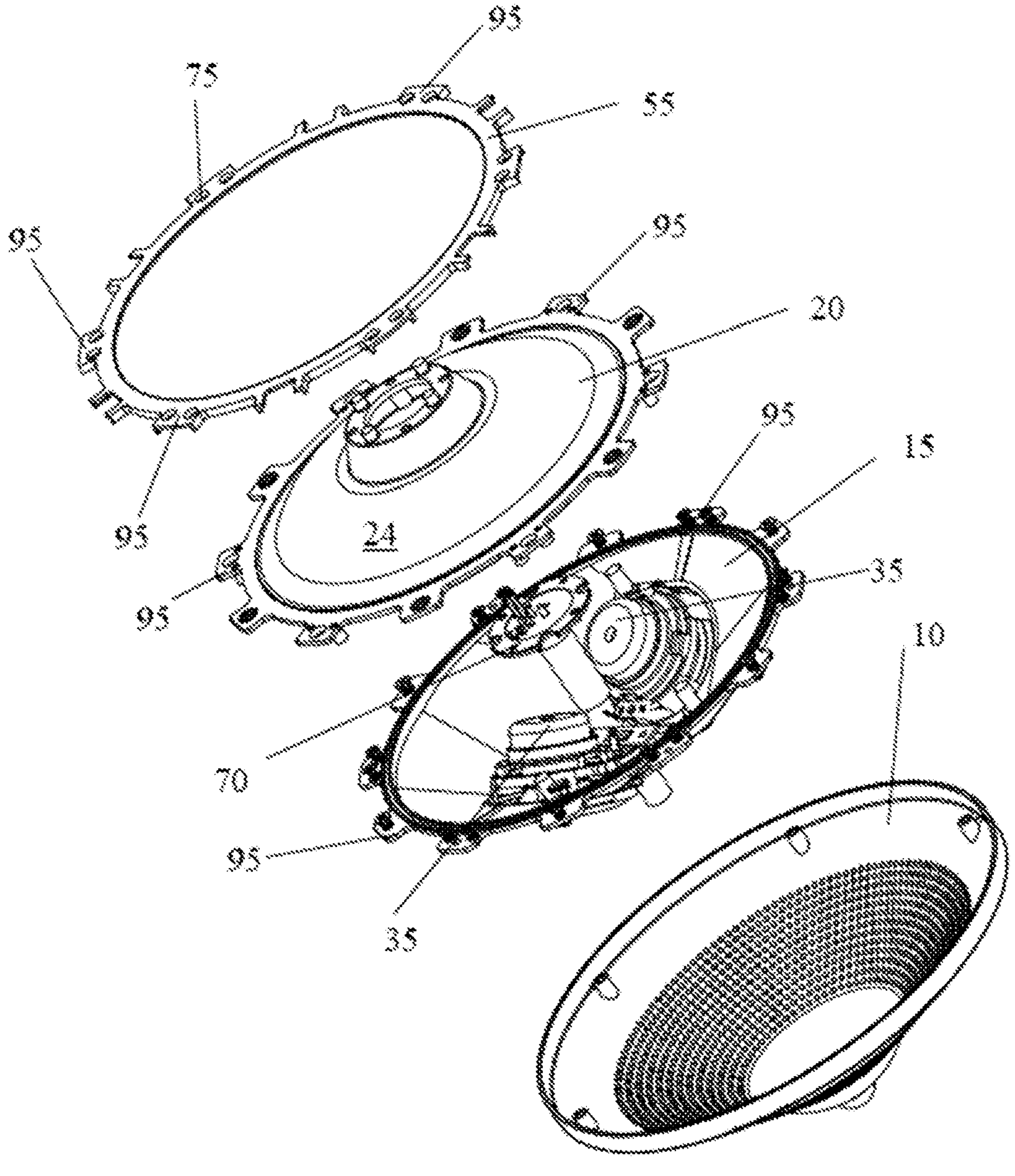
FIG. 5 is a bottom, exploded view of a portion of a light and speaker apparatus, according to multiple embodiments and alternatives.
Figure 6:
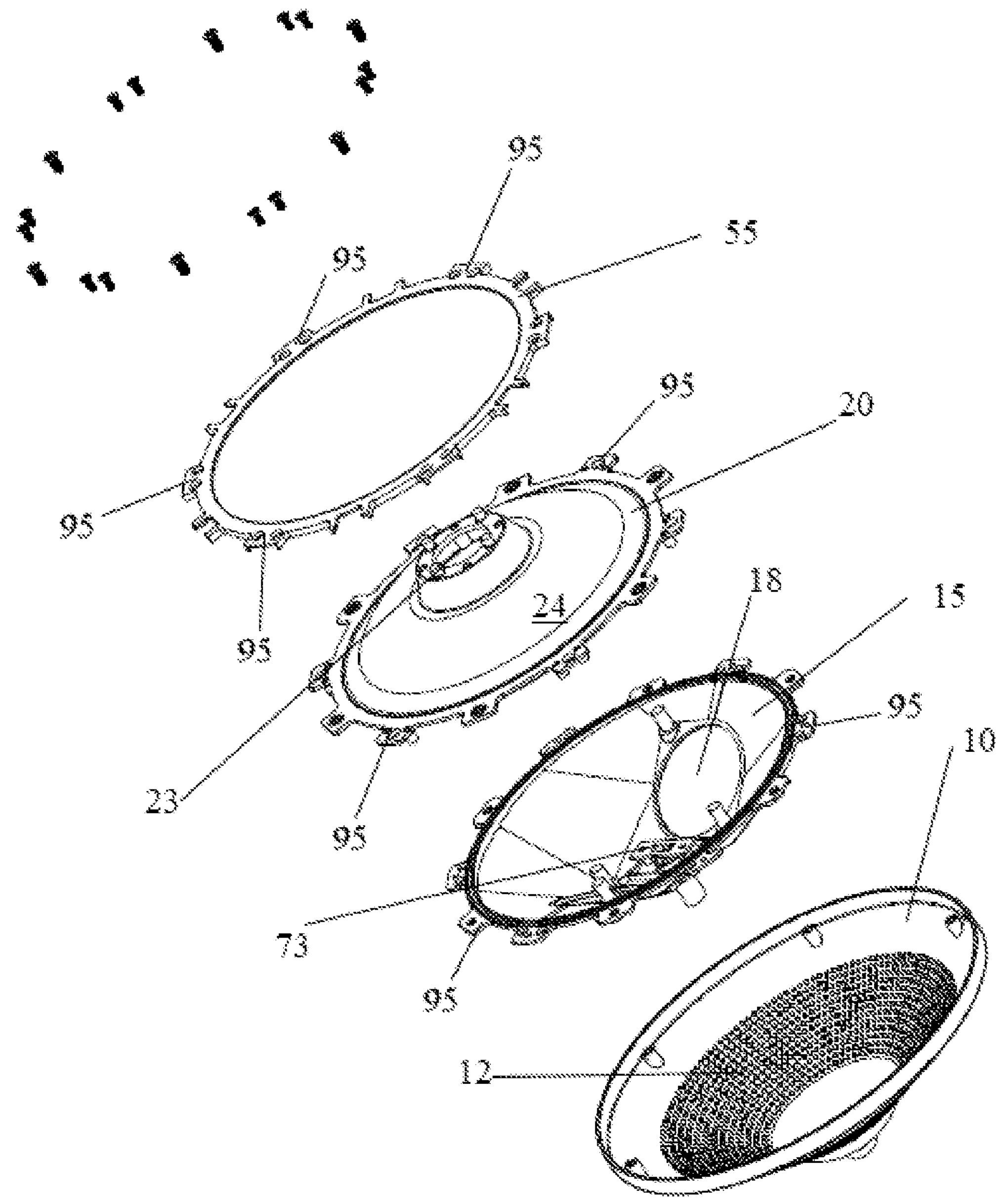
FIG. 6 is a bottom, exploded view of a portion of a light and speaker apparatus, according to multiple embodiments and alternatives.

FIGS. 5-6 illustrate exploded views of the connection between ring 55, bottom cover 20, top cover 15, and speaker mask 10 with screws 45 (as a non-limiting example). As previously noted, the speaker mask 10 is adapted to receive the top cover 15, the top cover 15 is adapted to receive the bottom cover 20, and the bottom cover 20 is adapted to receive ring 55. In some embodiments the ring 55 is secured to the bottom cover 20, the top cover 15, and the speaker mask 10 with screws 45 and nuts 50 (as non-limiting examples). In FIGS. 5-6, the screws and nuts pass thru a plurality of tabs 95 extending from the outer edge of the ring 55, the bottom cover 20, and the top cover 15. The screws are then received in bores located adjacent to the external edge of the speaker mask 10. Accordingly, the ring 55, the bottom cover 20, and the top cover 15 are each sized to be received within the speaker mask 10. As shown in FIG. 6, the top cover 15 defines the pair of speaker borings 18 that are adapted to receive the speakers 35, and the light receiver 73 is mounted to the bottom surface 17 of the top cover 15 and is adapted to receive the light 60. In FIG. 5, the speakers 35 are received in the speaker borings 18 of the top cover 15, and the light 60 is mounted to the light receiver 73. As shown in FIG. 5, the housing 80 and the light plate 70 are connected to the bottom of light 60, and the light plate 70 is received within the light plate boring 23 defined by the bottom cover 20. A lamp holder (not numbered) extends outward from plate 70.

Figure 7:
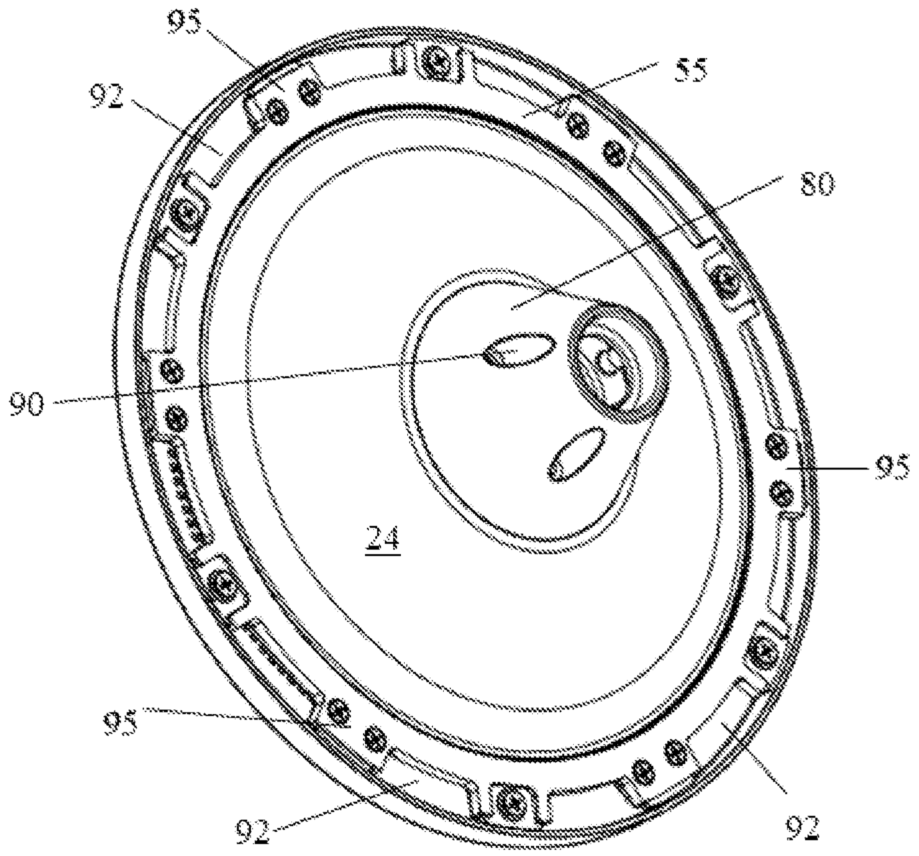
FIG. 7 is a bottom view of a portion of a light and speaker apparatus, according to multiple embodiments and alternatives.

In FIG. 7, the ring 55 and the housing 80 are mounted to the exterior surface 24 of the bottom cover 20, which is secured to the top cover 15 and the speaker mask 10 with screws 45. As best illustrated in FIG. 2B, the channel 21 is defined by the internal surface of the speaker mask 10 and the top surface 16 of the top cover 15, thereby permitting sound waves to travel downwards. In some embodiments, the channel 21 further comprises a series of exit notches 92 which permit sound waves that pass thru the channel 21 to exit the apparatus 1 and emit downwards. As illustrated in FIGS. 5-7, a plurality of tabs 95 extend from the outer edge of the ring 55, the bottom cover 20, and the top cover 15. In FIG. 7, the ring 55, the bottom cover 20, and the top cover 15 are sized to fit within the external edge of the speaker mask 10, and the plurality of tabs 95 mate with the external edge of the speaker mask 10. Accordingly, the series of exit notches 92 are defined by the plurality of tabs 95, the external edge of the speaker mask 10, and the outer edge of the ring 55, the bottom cover 20, and the top cover 15.

As previously noted, the top and bottom covers 15, 20 define a chamber 22 which receives both the speakers 35 and the light 60. In FIG. 7, the housing 80 comprises a plurality of slots 90 which are adapted to receive a plurality of screws.

Figure 8:
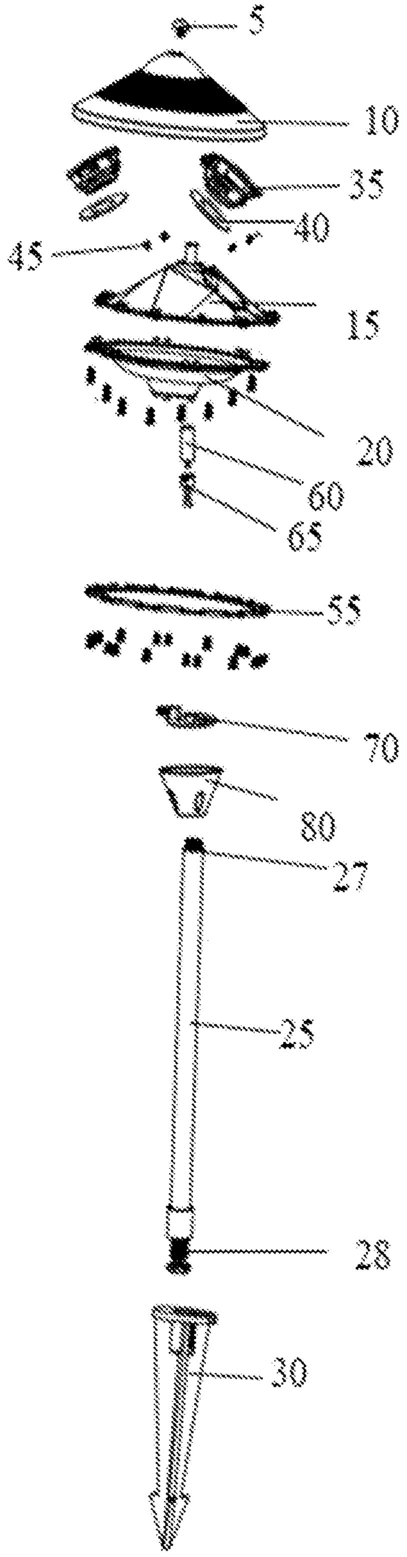
FIG. 8 is an exploded view of a light and speaker apparatus, according to multiple embodiments and alternatives.

FIG. 8 illustrates an exploded view of the light and speaker apparatus 1. In some embodiments, the top screw 5 fastens the speaker mask 10 to a boring extending upwards from the top surface 16 of top cover 15. In some embodiments, both the speaker mask 10, and the top cover 15 having conical-shapes (as a non-limiting example). Speaker washers 40 are fit about the bottom of the speakers 35, and then the speakers 35 are received within the speaker borings 18 defined by the top cover 15. The light 60 is mounted to the lampholder 65, then extends into housing 80 and is covered by a light plate 70. The ring 55 and bottom cover 20 engage the bottom surface 17 of top cover 15 and are secured together with nuts 50 and screws 45, and the light plate 70 is received in the light plate boring 23. The housing 80 is attached to the top end 27 of stem 25 and the bottom 28 of the stem 25 is connected to stake 30. The stake 30, and the bottom end of the stem 25, are fitted to receive wire 85 which runs through the stem 25 to provide power for the light and speaker apparatus 1.

It will be understood that the embodiments described herein are not limited in their application to the details of the teachings and descriptions set forth, or as illustrated in the accompanying FIGURES. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A light and speaker apparatus, comprising:

a light;

at least one speaker;

a speaker mask defining a plurality of openings to permit sound waves from the at least one speaker to emit upwards;

a top cover having a top surface and a bottom surface, wherein the top surface of the top cover is adapted to receive the speaker mask; and a channel defined by an internal surface of the speaker mask and the top surface of the top cover, wherein said channel permits sound waves from said at least one speaker to emit downwards from said apparatus;

wherein the channel further comprises a series of exit notches which permit sound waves passing through the channel to exit the apparatus and emit downwards.

2. The light and speaker apparatus of claim 1, wherein the bottom surface of the top cover is adapted to receive a bottom cover; and wherein the bottom surface of the top cover and an interior surface of the bottom cover define a chamber.

3. The light and speaker apparatus of claim 2, wherein the light and a portion of the at least one speaker are positioned within the chamber.

4. The light and speaker apparatus of claim 3, wherein the speaker mask, the top cover, and the bottom cover each define an external edge, wherein a plurality of tabs extend from the external edge of the top cover and the bottom cover.

5. The light and speaker apparatus of claim 4, wherein the top cover and the bottom cover are sized to fit within the speaker mask and the plurality tabs of the top and bottom covers are adapted to engage the external edge of the speaker mask.

6. The light and speaker apparatus of claim 5, wherein the series of exit notches are further defined by the plurality of tabs of said top and bottom covers, and the external edge of the speaker mask, the top cover, and the bottom cover.

7. The light and speaker apparatus of claim 1, wherein the speaker mask is positioned above the light and the at least one speaker; and wherein said channel and said plurality of openings are each positioned adjacent to the at least one speaker.

8. A light and speaker apparatus, comprising:

a light;

at least one speaker;

a speaker mask positioned above the light and the least one speaker, wherein the speaker mask defines a plurality of openings to permit sound waves from the at least one speaker to emit upwards;

a top cover having a top surface and a bottom surface, wherein the top surface of the top cover is adapted to receive the speaker mask, wherein the bottom surface of the top cover is adapted to receive a bottom cover, wherein the bottom surface of the top cover and an interior surface of the bottom cover define a chamber, wherein the light and a portion of the at least one speaker are positioned within the chamber; and a channel defined by an internal surface of the speaker mask and the top surface of the top cover, wherein said channel permits sound waves from said at least one speaker to emit downwards from said apparatus;

wherein the speaker mask, the top cover, and the bottom cover each define an external edge, wherein a plurality of tabs extend from the external edge of the top cover and the bottom cover.

9. The light and speaker apparatus of claim 8, wherein the top cover and the bottom cover are sized to fit within the speaker mask and the plurality tabs of the top and bottom covers are adapted to engage the external edge of the speaker mask.

10. The light and speaker apparatus of claim 9, wherein the series of exit notches are further defined by the plurality of tabs of said top and bottom covers, and the external edge of the speaker mask, the top cover, and the bottom cover.

11. The light and speaker apparatus of claim 8, wherein the channel further comprises a series of exit notches positioned in a bottom end of the apparatus, wherein said series of exit notches permit sound waves passing through the channel to exit the apparatus and emit downwards.

12. The light and speaker apparatus of claim 8, wherein said channel and said plurality of openings are each positioned adjacent to the at least one speaker.

13. The light and speaker apparatus of claim 8, wherein the top surface of the top cover further defines an at least one speaker boring being adapted to receive the at least one speaker.

14. A light and speaker apparatus, comprising:

a light;

at least one speaker;

a speaker mask positioned above the light and the least one speaker, wherein the speaker mask defines a plurality of openings to permit sound waves from the at least one speaker to emit upwards;

a top cover having a top surface and a bottom surface, wherein the top surface of the top cover is adapted to receive the speaker mask, wherein the bottom surface of the top cover is adapted to receive a bottom cover, wherein the bottom surface of the top cover and an interior surface of the bottom cover define a chamber, wherein the light and a portion of the at least one speaker are positioned within the chamber; and a channel defined by an internal surface of the speaker mask and the top surface of the top cover, wherein said channel permits sound waves from said at least one speaker to emit downwards from said apparatus;

wherein the channel further comprises a series of exit notches positioned in a bottom end of the apparatus, wherein said series of exit notches permit sound waves passing through the channel to exit the apparatus and emit downwards.

15. The light and speaker apparatus of claim 14, wherein the speaker mask, the top cover, and the bottom cover each define an external edge, wherein a plurality of tabs extend from the external edge of the top cover and the bottom cover;

wherein the top cover and the bottom cover are sized to fit within the speaker mask and the plurality tabs of the top and bottom covers are adapted to engage the external edge of the speaker mask; and wherein the series of exit notches are further defined by the plurality of tabs of said top and bottom covers, and the external edge of the speaker mask, the top cover, and the bottom cover.

16. The light and speaker apparatus of claim 14, wherein said channel and said plurality of openings are each positioned adjacent to the at least one speaker.

17. The light and speaker apparatus of claim 14, wherein the top surface of the top cover further defines at least one speaker boring being adapted to receive the at least one speaker.

18. The light and speaker apparatus of claim 14, wherein the speaker mask comprises a conical shape and is detachable from said apparatus.

19. A light and speaker apparatus, comprising:

a light;

at least one speaker;

a speaker mask defining a plurality of openings to permit sound waves from the at least one speaker to emit upwards;

a top cover having a top surface and a bottom surface, wherein the top surface of the top cover is adapted to receive the speaker mask; and a channel defined by an internal surface of the speaker mask and the top surface of the top cover, wherein said channel permits sound waves from said at least one speaker to emit downwards from said apparatus;

wherein the speaker mask is positioned above the light and the at least one speaker; and wherein said channel and said plurality of openings are each positioned adjacent to the at least one speaker.

* * * * *